United States Patent [19]

Typpo

[11] Patent Number: 5,132,619
[45] Date of Patent: Jul. 21, 1992

[54] THICKNESS GAUGE HAVING A LOW UNSPRUNG WEIGHT FOR MOVING SHEET MATERIAL FOR LIGHTWEIGHT PAPER

[75] Inventor: Pekka M. Typpo, Cupertino, Calif.

[73] Assignee: Impact Systems, Inc., San Jose, Calif.

[21] Appl. No.: 708,172

[22] Filed: May 31, 1991

[51] Int. Cl.⁵ .................. G01B 7/10; D21F 7/06; G01R 33/12
[52] U.S. Cl. ..................... 324/231; 73/159
[58] Field of Search ............... 324/229–231; 340/675; 162/198, 263; 33/384; 73/159; 271/262, 263

[56] References Cited

U.S. PATENT DOCUMENTS 4,929,895  5/1990  Typpo .................. 324/231

*Primary Examiner*—Walter E. Snow
*Attorney, Agent, or Firm*—Flehr, Hohbach, Test, Albritton & Herbert

[57] ABSTRACT

A caliper gauge for relatively thin moving sheet material is provided by the use of a pair of outer ring air bearings flexibly supported which tend to flatten the sheet. An inner central portion of each ring respectively carries active and passive magnetic circuit means with the passive means being supported by an elongated strap of Kevlar which is elongated in the machine direction of the sheet material. This provides for very low unsprung weight.

8 Claims, 4 Drawing Sheets

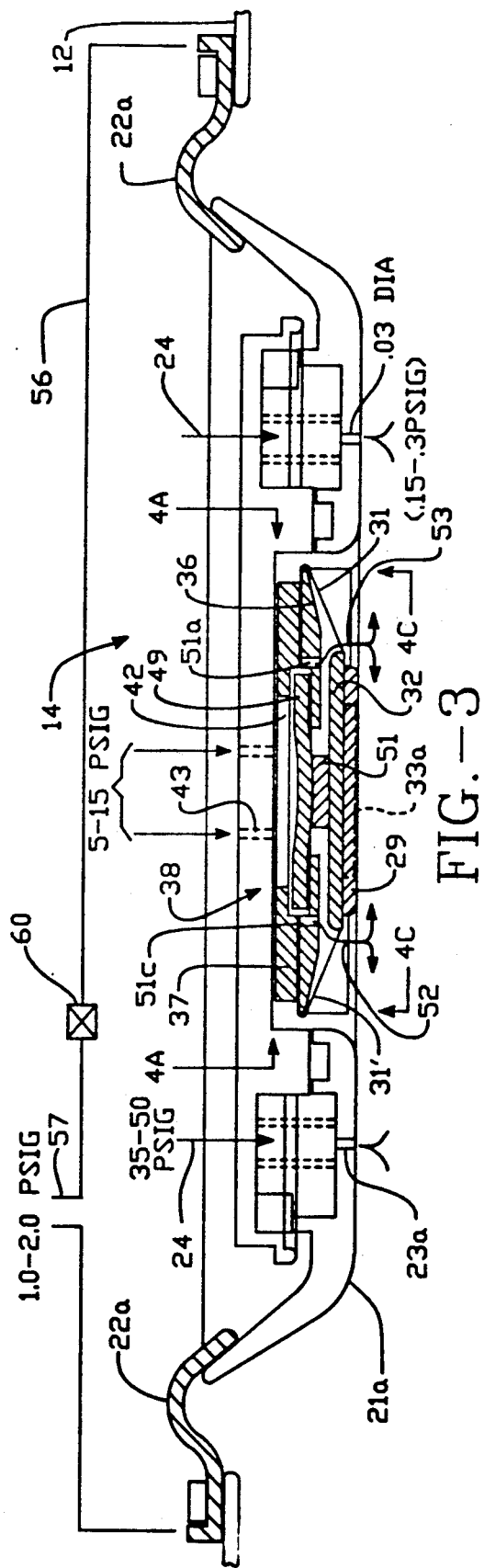
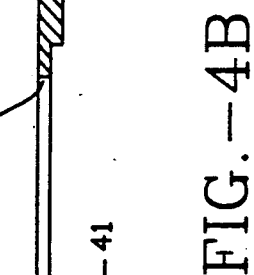
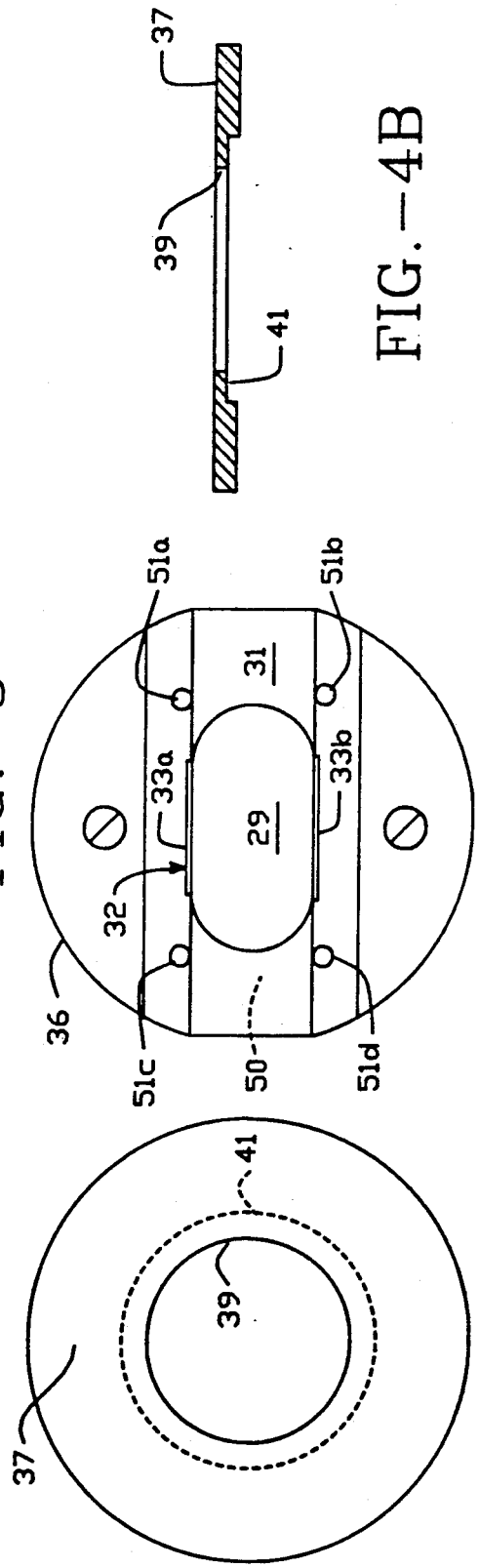

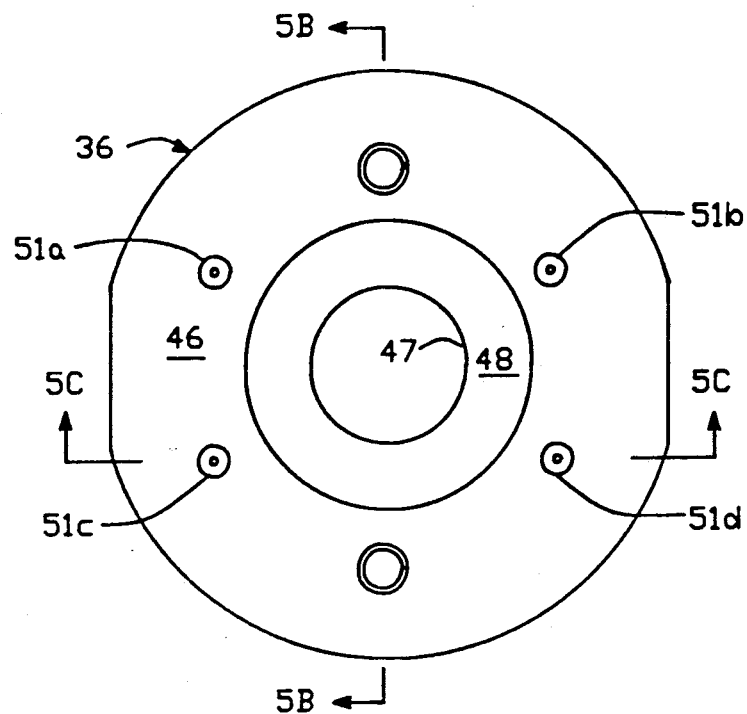
FIG.—5A
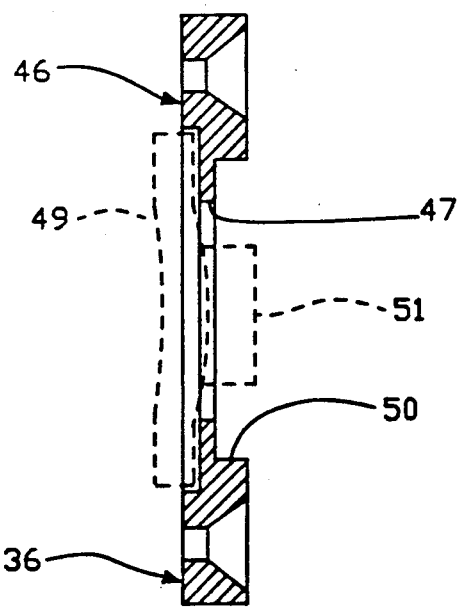
FIG.—5B
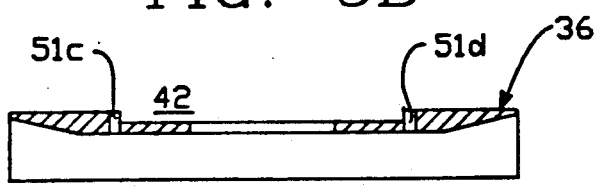
FIG.—5C

THICKNESS GAUGE HAVING A LOW UNSPRUNG WEIGHT FOR MOVING SHEET MATERIAL FOR LIGHTWEIGHT PAPER

The present invention is directed to a thickness gauge for moving sheet material for lightweight paper, and more particularly for measuring the caliber of such paper.

BACKGROUND OF THE INVENTION

In the measurement of the caliper of lightweight paper, care must be taken to avoid marking or ripping the paper. This is especially critical when slight flaws are present in the sheet material which must be accommodated by the thickness gauge. In addition to being tolerant to flaws, the measuring gauge or thickness gauge should be tolerant to ripples and curvatures in the paper, especially in the cross-direction. Lastly, a thickness gauge should accommodate the so-called passline of the moving paper which may vary as much as one-half inch.

One type of thickness gauge which meets several of the above requirements is shown in U.S. Pat. No. 4,929,895 in the name of Pekka M. Typpo, the present inventor and assigned to the present assignee. This patent utilizes a pair of flexibly mounted air bearings. However, it is still desirable to provide further improvements in a thickness gauge so that lighter papers can be measured with greater accommodation of various flaws, ripples and curvatures of the paper.

OBJECT AND SUMMARY OF THE INVENTION

It is therefore an object of the present invention to provide an improved thickness gauge for moving sheet material.

In accordance with the above object, there is provided a thickness gauge for moving sheet material having first and second magnetic circuit means juxtaposed on opposite sides of the sheet and indicative of its thickness. The gauge comprises upper and lower means on opposite sides of the sheet for flexibly carrying the first and second magnetic circuit means. The upper and lower means each includes opposed outer bearing means having a relatively rigid ring portion and include means for flexibly causing the outer bearing means to move toward engagement with the sheet and toward each other. One of the upper and lower means includes a relatively rigid central portion connected to the ring portion and carrying the first magnetic circuit means. The other of the upper and lower means has a relatively rigid central portion carrying the second magnetic circuit mean. This is coupled by elongated strap means to the outer bearing means with the strap means being at a substantially fixed angle. Such strap means allows vertical movement of the magnetic circuit means perpendicular to the sheet but with negligible movement parallel to the sheet. Resilient means push the central portion of the magnetic circuit means into contact with the sheet.

BRIEF DESCRIPTION OF THE DRAWINGS

FIG. 3 is a cross-sectional view which shows in greater detail the upper portion of FIG. 2.

FIG. 4A is a plan view of a component of FIG. 3 taken along the lines 4A—4A of FIG. 3.

FIG. 4B is a cross-sectional view of FIG. 4A.

FIG. 4C is a plan view taken along the line 4C—4C of FIG. 3.

FIG. 5A is a plan view of the component shown in FIG. 4C but from an opposite orientation.

FIG. 5B is a cross-sectional view taken along the line 5B—5B of FIG. 5A.

FIG. 5C is a cross-sectional view taken along the lines 5C—5C of FIG. 5A.

DESCRIPTION OF THE PREFERRED EMBODIMENT

Figure 1:
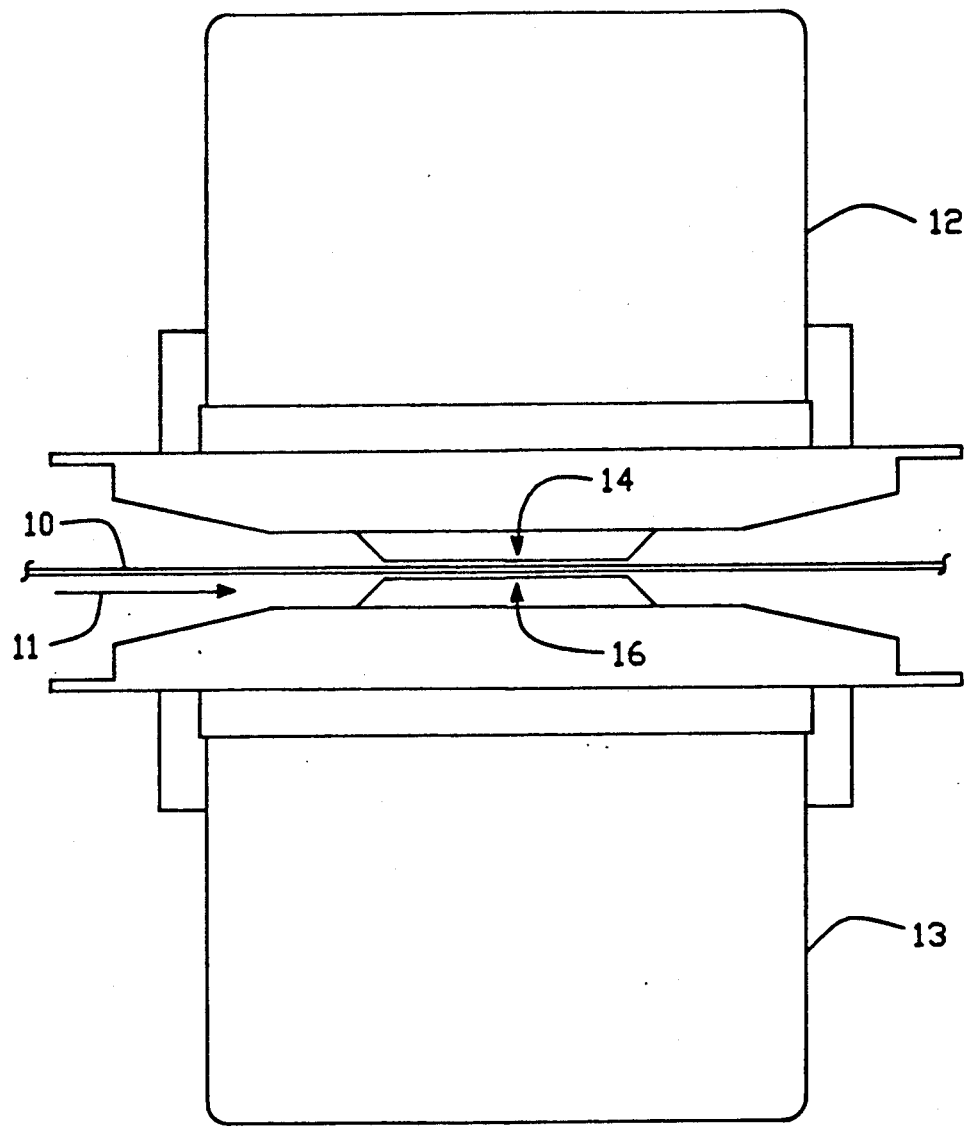
FIG. 1 is an elevational view of the overall apparatus of the present invention as it would be installed in the path of a paper making machine.

Referring to FIG. 1, the thickness or caliper gauge of the present invention is used in conjunction with a scanner which traverses or scans the longitudinally moving paper 10 which has a so-called machine direction of movement indicated by the arrow 11. A framework (not shown) which is in a cross direction to the machine direction 11 supports a scanning upper gauge portion 12 and a lower gauge portion 13. The essential components of the thickness or caliper gauge are contained in the juxtaposed portions close to the sheet at 14 and 16 for the upper and lower gauge portions, respectively.

Figure 2:
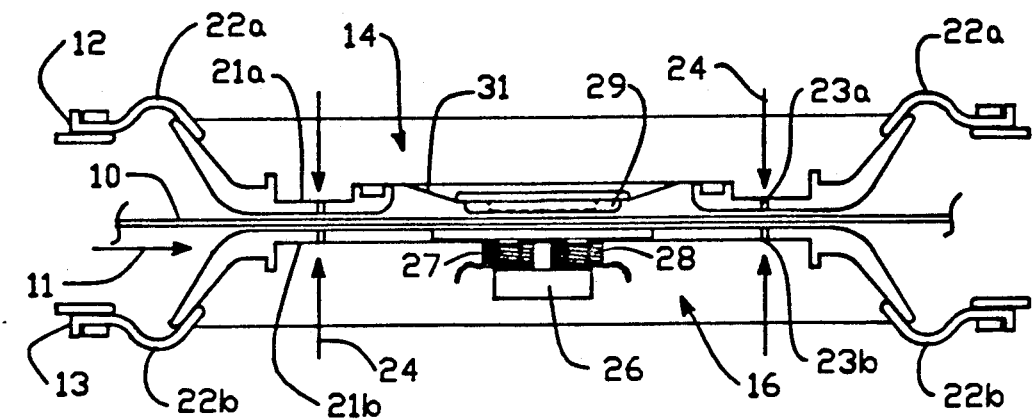
FIG. 2 is an enlarged cross-sectional view of a portion of FIG. 1 showing the invention in greater detail.

FIG. 2 shows in greater detail the upper and lower gauge portions 14 and 16. Each includes a relatively rigid ring portion 21a and 21b which are opposed on opposite sides of sheet 10. Both are flexibly suspended from the upper and lower scanning gauge portions 12 and 13 by flexible rubber rings 22a, 22b, which are fixed respectively to the gauge portions 12 and 13. Spaced around each ring 28a and 28b are a plurality of air exits 23a, 23b. Air exiting these apertures provide an air bearing between the ring and the sheet. The vectors 24 illustrate the path of the arrow through the exits 23a, 23b.

Thus far as described, the structure of FIG. 2 is similar to that shown in the above Typpo patent. The outer air bearings tend to flatten the moving sheet 10 so that the magnetic circuit measuring apparatus carried in the interior of the rings more accurately measures the thickness of the paper.

Such magnetic circuit apparatus is shown by the U-shaped magnetic core 26, carried by the ring 21b which includes the coils 27 and 28. The magnetic flux generated by this active portion of the thickness sensing circuit is passed through the paper and an elongated disc 29 made of a suitable ceramic such as ferrite which is carried by the upper ring 21a. In a manner well known in the art, as discussed in Typpo U.S. Pat. No. 4,791,367, this magnetic circuit measures thickness or caliper.

As will be described in detail below, the relatively rigid central magnetic disc portion 29 is coupled to the ring 21a by an elongated strap 31. This strap is elongated in the direction of movement 11 of the paper sheet 10 so as to make more tolerant the resiliently suspended elongated ceramic disc 29 to ripples or curvatures of the paper in the cross-direction. In other words, since its narrow dimension is in the cross direction. Finally, as also discussed above and in conjunction with the above '895 Typpo patent, due to the outer bearing structure 21a, 21b, the changes in the so-called passline of the paper 10 are minimized or at least isolated from the inner portion of the measuring system which includes the magnetic circuits 26 and 29.

FIG. 3 shows the upper gauge portion 14 in greater detail. This is the portion that carries the effectively passive magnetic circuit means; namely, the ferrite elongated disc 29 which is also illustrated in FIG. 4C. Elongated strap 31 is fastened to ferrite disc 29 by means of an aluminum holder 32 having bent over sides 33a and 33b. Thus the strap 31 is physically held between the ferrite disc 29 and holder 32 and may in fact also be glued.

Strap 31 is preferably made of a flexible fabric which is nonstretchable; Kevlar, a trademark of DuPont (an aramid fiber) is preferred. The strap should also be heat resistant because of the high ambient temperatures. Its two ends are wrapped around the top side of a second aluminum holder 36 (again as best shown in FIG. 4C) and the strap can be glued to the top of holder 36 and also retained when the holder 36 is fastened to a circular shim 37 (also shown in FIGS. 4A and 4B).

Shim 37 is connected to a rigid support unit 38 which is attached to the ring 21a. Shim 37 includes an aperture 39 having a recess 41. The aperture 39 effectively forms part of actuator cavity 42 into which air is admitted by the flow restrictors 43 which are supplied air at a nominal 5-15 psig to provide within the cavity 42 a reduced pressure which is transmitted to the ferrite disc 29 to cause it to move toward the sheet 10.

FIGS. 5A through 5C better illustrate how this is accomplished where in FIG. 5A the holder 36 is again illustrated from the opposite side 46 which includes the aperture 47 and associated recess 48, into which is placed a resilient disc-shaped sheet 49 (for example of silicone rubber). Thus, again referring to FIG. 3, sheet 49 closes the aperture 47 (FIG. 5B) and when holder 36 is abutted against shim 37 forms the other side of the actuator cavity 42. Thus the air pressure in the cavity causes the sheet 49 to bulge toward the moving paper sheet. Sheet 49 through the aperture 47 pushes against a sponge structure 51 which is also shown in dashed outline in FIG. 5B and the sponge structure in turn is glued or connected to the aluminum holder 32. Thus, air pressure in actuator cavity 42 pushes against the resilient sheet 49 which in turn pushes against the sponge 51 which in turn is connected to the aluminum holder 32 which retains the ferrite magnetic disc 29. All of the foregoing acts as resilient means for pushing the disc 29 into contact with the moving sheet.

As illustrated both in FIGS. 4C and 5B holder 36 includes a channel 50 which will accommodate aluminum holder 32 if, for example, a bulge in the moving sheet opposes the above normal downward push. In this case, sponge 52 would almost be totally compressed.

The upstream portion of the strap 31 illustrated in FIG. 3, and designated at 31', acts effectively as a lever fixed at a relatively shallow angle (e.g., 30°) so that there is negligble movement in a direction parallel to the moving sheet. Moreover, the fixed angle is influenced only by a change in a thickness between the outer air bearings which is minimal. Since the strap is pivoted at or tied to the outer air bearing, there is no alignment problem (in the machine direction) with the opposite magnetic circuit due to passline variations. Rather there is only the second order effect of scanner misalignment.

Thus ferrite disc 29 can be made as small as possible reducing its mass to, e.g., 2 grams.

Thus the downstream portion of strap 31 is relatively uncritical since it is effectively in compression compared to the tension of the portion 31'. Though Kevlar is a preferred material for the strap portion 31', an alternative might be merely to use a more rigid metal strap which is hinged.

Referring to FIG. 3, the upper air bearing provided by the air exits 23a are supplied air as indicated by the vectors 24, as for example, at pressures of 35 to 50 psig. By the small diameter air exits 23a which may be, for example, 0.03 inches, this pressure is reduced at the surface of the ring 21a and paper 20 to, for example, from 0.15 to 0.3 psig; this is a maximum pressure at the air exits. However, this pressure is still less than the differential added pressure in the actuator cavity 42 which is greater than the above pressure, by, for example, 0.2 to 1.0 psig. This might be termed a delta pressure. Thus this insures that even though an air bearing is provided by the outer ring 21a that central disc 29 is moved into engagement with the sheet. Moreover, this delta pressure tends to remain constant to ensure a constant engagement force with the sheet; this is true even with a change in outer air bearing pressures for different weight paper. This promotes accuracy.

With respect to the lower gauge portion illustrated in FIG. 2 at 16, similar exits 23b are provided with, for example, an air pressure supplied at 5 psig and only a small "trickle" of air exiting the exits 23b so that in effect, the moving paper sheet 10 is riding on the ring 21b and its effective planar extension which carries the active magnetic measuring elements 26, 28. If wear or friction is not a problem even the "trickle" can be eliminated.

As illustrated in FIG. 3 and more completely in FIG. 5C, the actuator cavity 42 includes air escape apertures 51a through 51d; typically of a diameter of 0.032 inches. These calibrated apertures allow escape of air as shown by the arrows 52 and 53 so that there is a constant differential pressure between cavity 42 and the sheet area to provide a constant contacting force as discussed above.

The overall ring structure 21a (FIG. 3) and its flexible connection 22a is also resiliently mounted to the upper gauge head 12 by reason of the manifold 56 which is supplied an air pressure at input 57 as illustrated; either 1.5-3 psig if it is located beneath in the lower gauge head or 1.0 to 2.0 psig if located in the upper gauge head. Similarly, as illustrated in FIG. 2, the active magnetic circuit means in the gauging head 16 also has a pressure manifold (but not shown). The pressure manifold 56 includes a calibrated leak 60 which in combination with input 57 acting as a flow restrictor drops the input pressure to 0.07-0.14 psig. Such pressure balances the pressure at exit 23a (which, of course, is applied over a small area). In the lower manifold (not shown) a similar arrangement drops the pressure to 0.1-0.2 psig.

Figure 6:
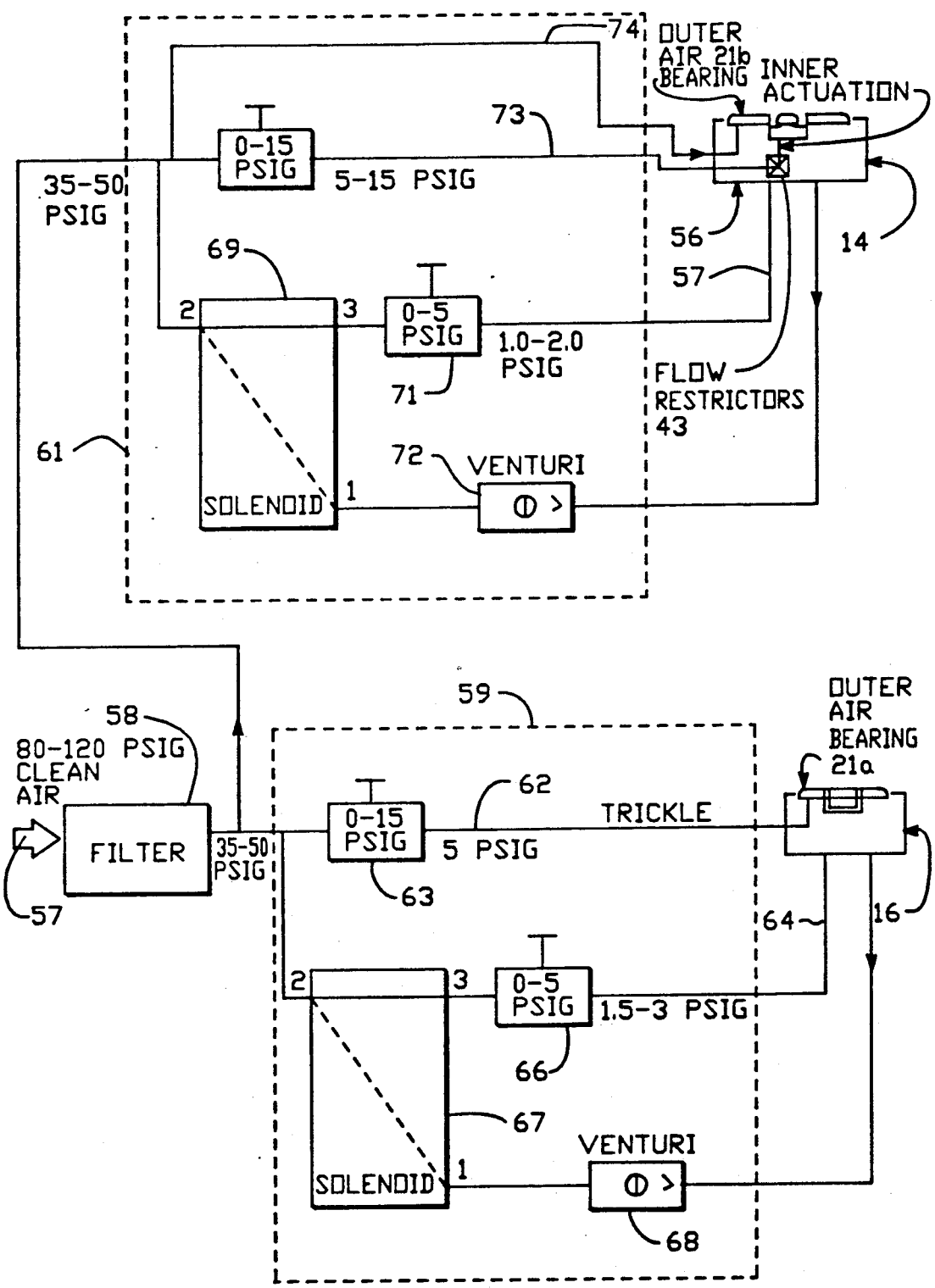
FIG. 6 is an air flow schematic showing the various sources of air which are supplied as indicated in FIGS. 2 and 3.

FIG. 6 is an air flow schematic where incoming air at the input 57 to a filter 58 is reduced to approximately 35 to 50 psig. Then it is coupled both to a manifold block assembly 59 which supplies the lower gauge portion 16 and a manifold block assembly 61 which supplies upper gauge portion 14. Thus referring to the manifold block 59 for sensing gauge portion 16, the outer air bearing 21a is supplied a trickle via the line 62 through a regulator 63. Then the overall manifold of the gauge head portion 16 through the line 64 is supplied 1.5 to 3.0 psig through the regulator 66, solenoid unit 67 and a return via the venturi 68. Similarly, the manifold 56 for the gauge portion 14 supplied air through input 57 via a similar solenoid unit 69, regulator 71 and venturi 72.

To supply the actuating cavity 42 is the input line 73 at a pressure of 5-15 psig which via the flow restrictors 43 reduces that to a much lower pressure but in any case a pressure above that of the outer air bearings. Finally line 74 is connected to the outer air bearings 21b.

Thus in summary, the use of the opposed air bearing and the strap mounted portion of the gauging head portion 14 provides improved alignment so that the accuracy of the measurement is maintained. The sponge 51 may slide on the resilient silicone rubber disc 49 to thus act as an effective joint. However, the amount of allowable movement is minimal because of the shallow angle 30° of the strap. Another advantage provided by the structure of the invention is the very low unsprung weight. Specifically, the weight of the ferrite disc 29 in combination with its aluminum holder 32 and the Kevlar strap 31 is approximately 2 grams. The lower gauge structure 16 as illustrated in FIG. 2, although having the air exits 23b to provide an air bearing, could be utilized in some cases without any air bearing. But the trickle of air through the air exits 23 does provide for a lower friction and wear. An air bearing, however, is necessary for the upper gauging head 14 to maintain the gauge just out of contact with the paper. This allows for greater flexibility and flattening effect of the bearings. In addition the resultant gaps allow starch lumps and shives on a paper sheet to pass through the gauge without any pinching.

Thus in summary, an improved thickness gauge especially for lightweight machine material has been provided.

What is claimed is:

1. A thickness gauge for moving sheet material having first and second magnetic circuit means juxtaposed on opposite sides of said sheet and indicative of the thickness of said sheet comprising:

upper and lower means on opposite sides of the sheet for flexibly carrying said first and second magnetic circuit means;

said upper and lower means each including opposed outer bearing means having a relatively rigid ring portion and including means for flexibly causing said outer bearing means to move toward engagement with said sheet and toward each other;

one of said upper and lower means including a relatively rigid central portion connected to said ring portion and carrying said first magnetic circuit means, the other of said upper and lower means having a relatively rigid central portion carrying said second magnetic circuit means and coupled by elongated strap means to said outer bearing means with said strap means at a substantially fixed angle, said strap means allowing vertical movement of said magnetic circuit means perpendicular to said sheet but with negligible movement parallel to said sheet and including resilient means for pushing said rigid central portion of said second magnetic circuit means into contact with said sheet.

2. A thickness gauge as in claim 1 including means for providing a predetermined air pressure where said resilient means includes a resilient sheet physically coupled to said rigid central portion, such resilient sheet being under said predetermined air pressure.

3. A thickness gauge as in claim 2 where said resilient means includes intermediate sponge means coupling said rigid central portion to said resilient sheet.

4. A thickness gauge as in claim 1 wherein said outer bearing means of at least one of said upper and lower means includes a plurality of spaced air exits to provide an air bearing between such ring and said sheet.

5. A thickness gauge as in claim 4 including means for providing a predetermined air pressure wherein said resilient means includes a resilient sheet under said air pressure physically connected to said rigid central portion and where said air pressure used for said resilient sheet is greater than the air pressure at said air exits whereby said central portion tends to move into engagement with said moving sheet.

6. A thickness gauge as in claim 1 including means for providing a predetermined air pressure wherein said resilient means includes a resilient sheet physically connected to said rigid central portion under said air pressure, the resilient sheet being placed in an actuator cavity pressurized at said air pressure, the resilient sheet closing a large aperture in said cavity, and said air pressure forcing said sheet and the rigid central portion towards the moving sheet and including air escape apertures in said cavity for providing a constant contact force with said sheet independent of said outer bearing means.

7. A thickness gauge as in claim 1 wherein said strap means is constructed of relatively nonstretchable and temperature resistant aramid material.

8. A thickness gauge as in claim 1 where said strap means is elongated in the direction of movement of the moving sheet material.

* * * * *